United States Patent [19]

Forbes et al.

[11] Patent Number: 5,380,235
[45] Date of Patent: Jan. 10, 1995

[54] TURKEY CALL WITH SILENCER

[75] Inventors: David R. Forbes; Carman S. Forbes, both of 4609 Blarney Dr. NE., Cedar Rapids, Iowa 52402; Ron M. Bean, Cedar Rapids, Iowa

[73] Assignees: David R. Forbes; Carman S. Forbes, Cedar Rapids, Iowa

[21] Appl. No.: 147,964

[22] Filed: Nov. 4, 1993

[51] Int. Cl.6 .............................. A63H 5/00
[52] U.S. Cl. ...................... 446/397
[58] Field of Search ............. 446/397, 398, 402, 404, 446/418, 422, 209; 43/1, 2; 24/68 F

[56] References Cited

U.S. PATENT DOCUMENTS

| | | | |
|---|---|---|---|
| 2,511,403 | 6/1950 | Fleener | 446/397 |
| 3,793,767 | 2/1974 | Pulley | 446/397 |
| 4,343,108 | 8/1982 | Lee | 446/397 |
| 4,527,985 | 7/1985 | Zoschg et al. | 446/397 |
| 4,642,065 | 2/1987 | Whedon et al. | 446/209 |
| 4,664,641 | 5/1987 | Hearn et al. | 446/397 |
| 4,846,753 | 7/1989 | Langston | 446/397 |
| 4,941,858 | 7/1990 | Adams | 446/397 |

Primary Examiner—Robert A. Hafer
Assistant Examiner—D. Neal Muir
Attorney, Agent, or Firm—Simmons, Perrine, Albright & Ellwood

[57] ABSTRACT

An improved turkey box call adapted to prevent the emission of inadvertent sounds which might otherwise alarm the prey. The call has a base and a pair of opposing standards, one with a post and the other with a camming surface with a pair of detents. The call includes a striker pivotally connected to the post, which is selectively adapted to interact individually or simultaneously with a pair of resonating panels such that sounds similar to those of tom and hen turkeys are cooperatively generated. The call also includes a cavity spaced between the pair of resonating panels, the striker, the pair of opposing standards, and the base. A separator, having a nub biased in sliding engagement with the camming surface, is adapted to space the striker apart from the pair of resonating panels as the nub is disposed in one of the detents and to allow the striker to interact with the pair of resonating panels as the nub is disposed in the other one of the detents.

3 Claims, 2 Drawing Sheets

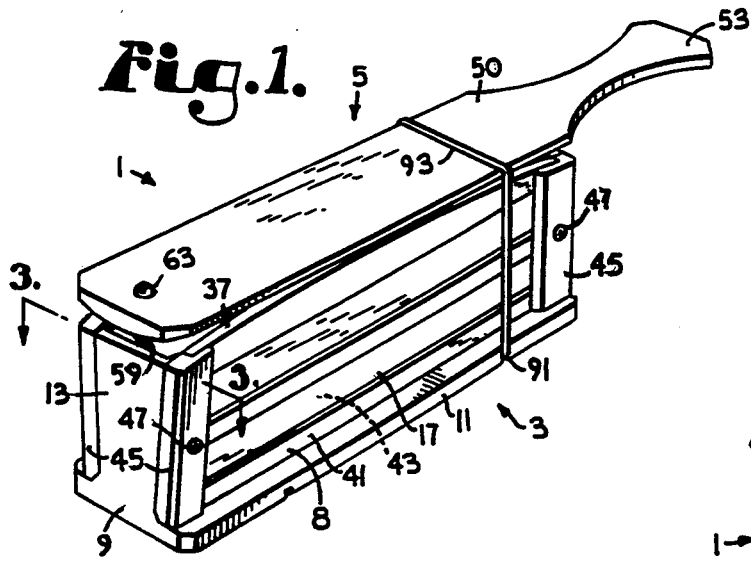
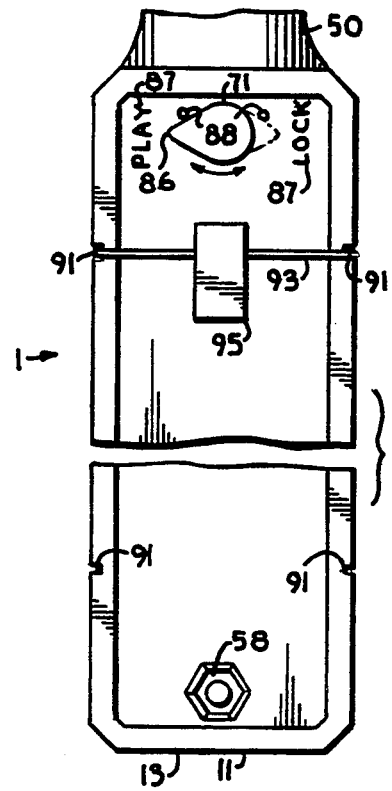
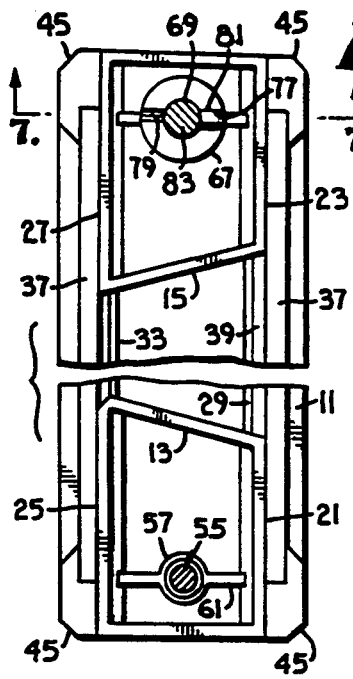
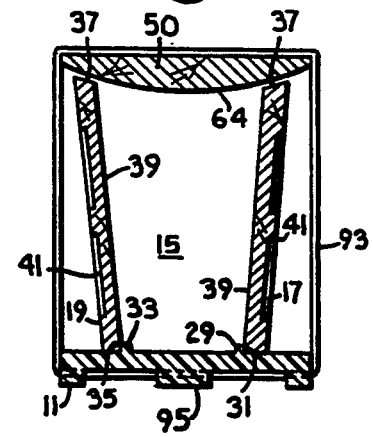
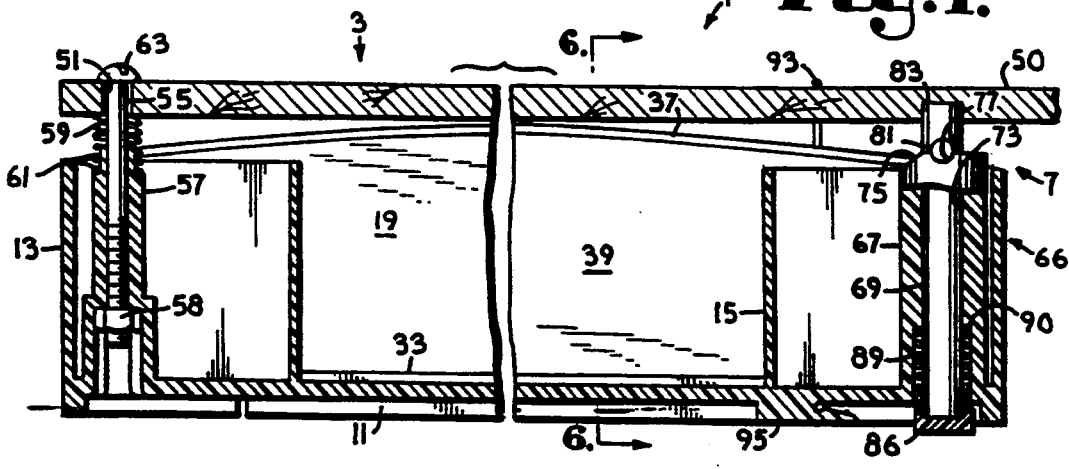

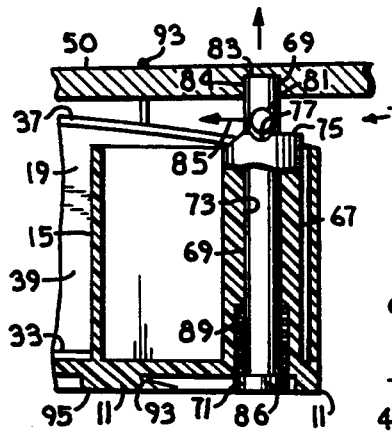
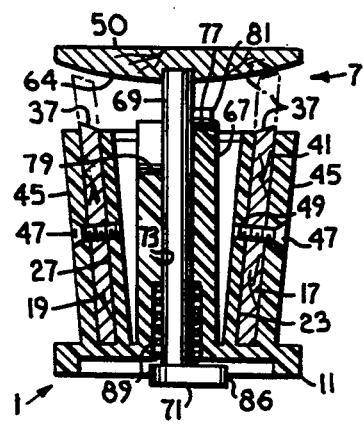
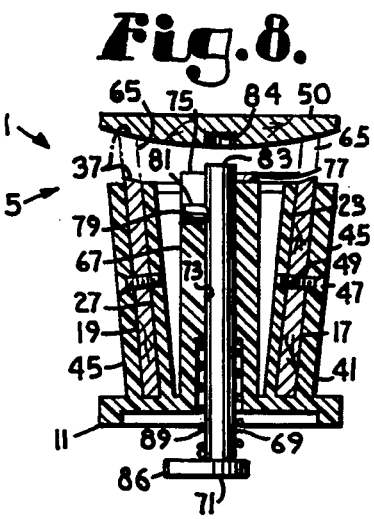
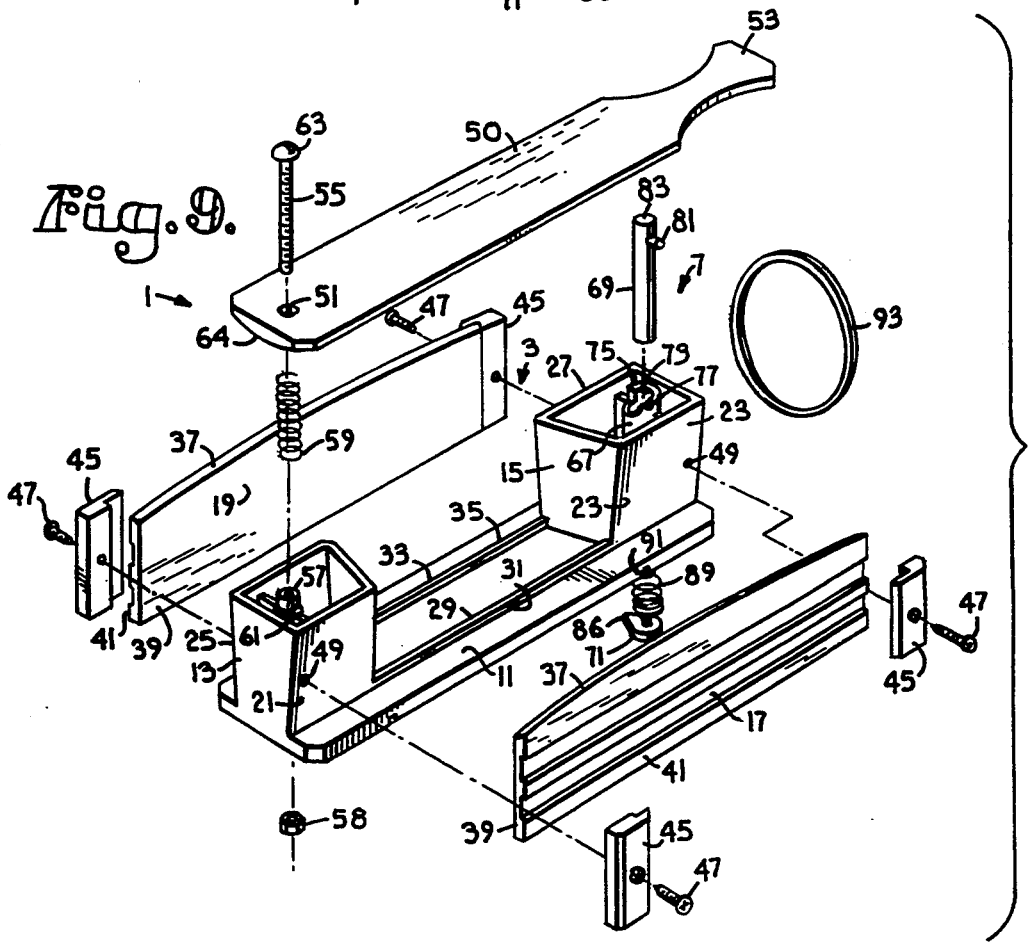

TURKEY CALL WITH SILENCER

BACKGROUND OF THE INVENTION

1. Field of the Invention

The present invention relates generally to a silencer for an animal call and, in particular, to a silencer for a wild turkey call being used for hunting purposes.

2. Description of the Related Art

Animal calls for hunting purposes are well known and a variety of different designs have been devised to meet the requirements of particular applications. These applications include adaptations for hunting various animals, including wild turkeys. Such calls comprise a variety of forms, including calls sometimes referred to as box calls. Such box calls generally comprise a hand-held, relatively small, generally rectangularly shaped device having one or more wood side plates, each having a free edge. A top, generally constructed of wood, is pivotally mounted generally transversely to the side plates. The top has a profile such that as the top is rubbed against the free edge of the side plate in short rocking movements, the call generates sounds approximating those normally emitted by a wild turkey.

Wild game, such as wild turkeys, being wary creatures, are extremely sensitive to any disturbance which might signal danger in their surrounding environment. A hunter, while creeping through the turkey's domain and while carrying one of the box calls, may inadvertently jostle the box call causing the top to rub against the side plates unexpectedly, thereby creating an unnatural noise readily identifiable as not arising from a turkey. Thus, nearby turkeys are immediately alerted to the presence of an intruder with obvious results.

Thus, what is needed is a turkey call which is adapted to prevent inadvertent creation of unintentional and unnatural noises.

SUMMARY OF THE INVENTION

An improved turkey call with silencer is adapted to prevent inadvertent creation of unintentional and unnatural noises. The call includes sound generating means for generating sounds similar to those of a wild turkey, resonating means for enhancing said sounds generated by said sound generating means, and silencing means for selectively disabling said sound generating means.

The sound generating means include a striker and a pair of opposing resonator panels having free edges. The striker and the pair of opposing resonator panels are configured to cooperatively form and area-type contact therebetween to produce the turkey sounds. A coating of chalk one or both of the surfaces forming the area-type contact enhances the sound-generating capability of the call.

The resonating means include a base and a pair of opposing standards extending generally outwardly from the base which, in conjunction with the striker and the pair of opposing resonator panels, form a resonating cavity therebetween. The striker is pivotally and springingly mounted to one of the opposing standards.

The silencing means includes a separator with a nub and the other one of the standards having a gently spiraling, camming surface with a pair of detents. A spring is adapted to bias the nub into abutting engagement with the camming surface. As the separator is rotated such that the nub is displaced from one of the detents to the other, the interaction between the nub and the camming surface causes the separator to be displaced axially.

As the nub is positioned in one of the detents, or a first station, the separator extends outwardly toward the striker such that the striker is prevented from contacting either one of the pair of opposing resonator panels. As the nub is positioned in the other one of the detents, or a second station, the separator is retracted away from the striker such that the striker is allowed to operably interact with the pair of opposing resonator panels.

An indicator connected to the separator is adapted, in conjunction with appropriate indicia, to indicate the position of the nub relative to the first and second stations.

OBJECTS AND ADVANTAGES OF THE INVENTION

Therefore, the principal objects and advantages of the present invention include: to provide a wild turkey call which is adapted to prevent inadvertent audio emissions therefrom; to provide such a call with a control for selectively placing the call in either an active or "play" configuration or an inactive or "lock" configuration; and to generally provide such a call which is efficient and reliable, economical to manufacture, capable of long operating life, and which generally performs the requirements of its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a turkey call with a silencer, according to the present invention.

FIG. 2 is an enlarged and fragmentary bottom view of the turkey call, showing an indicator and indicia thereof.

FIG. 3 is an enlarged, cross-sectional view of a striker of the call, taken generally along line 3—3 of FIG. 1.

FIG. 4 is an enlarged, and fragmentary lengthwise cross-sectional view, showing the turkey call in a "locked" configuration.

FIG. 5 is an enlarged, and fragmentary lengthwise cross-sectional view of the turkey call, similar to that shown in FIG. 4, but with the silencer from the "lock" configuration to a "play" configuration.

FIG. 6 is an enlarged cross-sectional view of the turkey call, taken generally along line 6—6 of FIG. 4.

FIG. 7 is an enlarged cross-sectional view of the turkey call, similar to that of FIG. 6, but taken generally along line 7—7 of FIG. 3.

FIG. 8 is an enlarged cross-sectional view of the turkey call, similar to that of FIG. 7, but showing a separator thereof retracted to the "play" configuration.

FIG. 9 is an exploded view of the turkey call, according to the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to an animal call, such as a call used by hunters to attract wild turkeys. The call 1 includes resonating means 3, sound generating means 5, and silencing means 7.

The resonating means 3 includes a resonator 8 having a body 9 with a base 11, a pair of opposing standards 13 and 15, and a pair of opposing resonator panels 17 and 19. The base 11 is generally sized and configured to be easily grasped by a hand of a user. The standards 13 and 15 extend generally upwardly from the base 11, as shown in FIGS. 4 and 9. The standard 13 has a first side 21 which is generally coplanar with a first side 23 of the standard 15, and a second side 25 which is generally coplanar with a second side 27 of the standard 15, as shown in FIGS. 3 and 9.

A runner 29 extends between the standards 13 and 15, adjacent to the base 11, such that a surface 31 thereof is aligned generally coplanarly with the first sides 21 and 23. Similarly, a runner 33 extends between the standards 13 and 15, adjacent to the base 11, such that a surface 35 thereof is aligned generally coplanarly with the second sides 25 and 27, as shown in FIG. 9. If desired, the standards 13 and 15 and the runners 29 and 33 may be formed integrally with the base 11. The standards 13 and 15, the runners 29 and 33, and the base 11 may be constructed of rigid plastic, or other suitable material.

Each of the resonator panels 17 and 19 is generally constructed of wood such as mahogany, or other suitable material. An upper edge 37 of each of the resonator panels 17 and 19 is arcuately convex and generally configured angularly and non-perpendicularly to the inner surface 39 and outer surface 41 thereof. A resonating cavity 43 is formed between the standards 13 and 15 and between the resonator panels 17 and 19 by securing the resonator panel 17 in abutting engagement with the first sides 21 and 23 and the runner 29, such as by a pair of cleats 45 and a pair of screws 47 in conjunction with corresponding tapped bores 49, and by similarly securing the resonator panel 19 in abutting engagement with the second sides 25 and 27 and the runner 33. The resonator panels 17 and 19 are oriented such that the edges 37 angle inwardly and downwardly toward the base 11.

The sound generating means 5 includes an elongate striker 50 having a throughbore 51 near one end and a handle 53 at the other end thereof, as shown in FIGS. 1 and 9. The striker 5 is generally connected to the standard 13 by a screw 55 connected to a post 57 of the standard 13, such as by a nut 58, as shown in FIGS. 4 and 9. The bore 51 is sized such that the striker 5 is loosely fitted and relatively freely rotatable about the screw 55. Preferably, a compression spring 59 is imposed between the striker 5 and a shoulder 61 of the post 57 such that the striker 5 is gently biased outwardly from the standard 13 against a head 63 of the screw 55, as shown in FIG. 4.

The striker 5 is generally constructed of wood such as mahogany, or other suitable material. The striker 5 has an underside 64 which is convex such that the striker 5 forms a generally area-type abutting engagement, with either, individually or simultaneously with both, of the edges 37 of the resonator panels 17 and 19, as shown in phantom lines referenced by the numeral 66 in FIG. 8, such that the cavity 43 is caused to resonate and emit sounds similar to those of a wild turkey as the striker 5 is rubbed against one or both of the edges 37.

The silencing means 7 includes a silencer 66 having a sleeve 67, a separator 69, and indicating means 71. The sleeve 67 is generally contained within the standard 15, as shown in FIGS. 3 and 9, with a throughbore 73 oriented generally perpendicularly to the base 11, as shown in FIGS. 7 and 8. An upper or camming surface 75 of the sleeve 67 gently spirals axially with a couple of detents 77 and 79.

The separator 69 is spaced in the throughbore 73 such that the separator 69 is rotatable and slidable axially relative to the sleeve 67. The separator 69 has a nub 81 offset from an upper end 83 thereof. As the separator 69 is disposed in a latched or "lock" configuration whereby the nub 81 rests in the detent 77 or first station, the upper end 83 extends beyond the standard 15 and bears against the underside 64 of the striker 50 such that the underside 64 is spaced apart from both of the edges 37 of the resonator panels 17 and 19, as shown in FIG. 7. If desired, the underside 64 may include a partial bore 84 to receive the upper end 83 as the separator 69 is disposed in the latched or "lock" configuration.

As the separator 69 is disposed in an unlatched or "play" configuration whereby the nub 81 rests in the detent 79 or second station, the upper end 83 is spaced apart from the underside 64 of the striker 50 such that the underside 64 can bear against one or both of the edges 37 of the resonator panels 17 and 19, as shown in FIG. 8. As the separator 69 is rotated such that the nub 81 is displaced from either one of the detents 77 or 79 to the other one of the detents 79 or 77, as indicated by an arrow designated by the reference numeral 85 in FIG. 5, the turkey call 1 is correspondingly displaced from the "lock" configuration to the "play" configuration. By reversing the indicated procedure, the turkey call 1 may be displaced from the "play" configuration to the "lock" configuration.

The indicating means 71 includes a pointer 86 connected to the separator 69 which indicates, in cooperation with indicia 87 on the base 11, such as "LOCK" and "PLAY" as shown in FIG. 2, whether the turkey call 1 is in the "lock" configuration or in the "play" configuration, as appropriate. If desired, stops 88 may be provided to facilitate locating the nub 81 in the detents 77 and 79, as shown in FIG. 2. A spring 89 is preferably imposed between the pointer 86 and a shoulder 90 of the sleeve 67 such that the nub 81 is biased in abutting engagement with the camming surface 75.

The call 1 also generally includes the base 11 having one or more slots 91 whereby retaining means of the turkey call 1, such as a resilient band 93 may be spaced thereabout for retaining the striker 5 in appropriate spacing relative to the remainder of the call 1. If desired, a clip 95 may be disposed on the base 11 to retain the band 93 in selected ones of the slots 91.

In an application of the invention 1, as a user is moving from one location to another, or is otherwise not presently in need of using the call 1 for its intended purposes, the pointer 86 is positioned relative to the indicia 87 to indicate "lock". As a result, the nub 81 is disposed in the detent 77 and the striker 5 is correspondingly spaced apart from the edges 37 of the resonator panels 17 and 19 such that the call 1 cannot inadvertently emit a sound which might otherwise alarm a wild turkey. After the user reaches a location whereby he is no longer jostling or jarring the call 1, which might otherwise cause unwanted noise emissions, the user rotates the pointer 86 relative to the indicia 87 to indicate "play". As a result, the nut 81 is disposed in the detent 79 and the separator 69 is retracted away from the striker 5. Thus, the call 1 is then ready to perform its intended purposes as desired by the user.

It is to be understood that while certain forms of the present invention have been illustrated and described herein, it is not to be limited to the specific forms or arrangement of parts described and shown.

What is claimed and desired to be secured by Letters Patent is as follows:

1. A turkey call device, comprising:
   (a) a base;
   (b) a pair of opposing standards connected to said base and extending generally perpendicularly therefrom; one of said pair of opposing standards having a post and the other one of said pair of opposing standards having a gently spiraling camming surface with a first detent and a second detent;
   (c) a striker having a handle and a convex lower surface; said striker pivotally connected to said post;
   (d) a pair of opposing resonator panels interconnecting said pair of opposing standards such that a cavity is formed between said base, said pair of opposing standards, said pair of opposing resonator panels, and said striker; each of said pair of opposing resonator panels having an upper edge adapted to interact separately or simultaneously with said lower surface of said striker such that sounds similar to those of a wild turkey can be generated thereby; one of said pair opposing resonator panels adapted to produce sounds mimicking those of a hen turkey and the other one of said pair of opposing resonator panels adapted to produce sounds mimicking those of a tom turkey;
   (e) a first spring adapted to bias said striker outwardly from said first one of said pair of opposing standards;
   (f) a separator having a nub such that as said nub is spaced in said first detent, said striker is prevented from contacting either of said pair of resonator panels, and as said nub is spaced in said second detent, said striker can operably contact said pair of resonator panels;
   (g) a second spring adapted to bias said nub into abutting engagement with said camming surface;
   (h) a pointer connected to the separator; and
   (i) indicia adapted, in conjunction with said pointer, to indicate the spacing of said nub relative to said pair of detents.

2. A turkey call device, comprising:
   (a) resonating means for enhancing sounds generated by said device; said resonating means including:
      (1) a base;
      (2) two opposing standards connected to said base and extending generally perpendicularly therefrom; and
      (3) two opposing resonator panels interconnecting said two opposing standards;
   (b) sound generating means for generating sounds similar to those of a wild turkey; said sound generating means including a striker mounted to a first one of said two opposing standards such that a cavity is formed between said base, said two opposing standards, said two opposing resonator panels, and said striker; and
   (c) silencing means for selectively disabling said sound generating means; said silencing means including a separator having a first station wherein said striker is prevented from contacting said two resonator panels, and a second station wherein said striker is allowed to operably contact said two resonator panels; said silencing means including:
      (1) a second one of said two opposing standards having a camming surface with a pair of detents; and
      (2) said separator having a nub such that said nub engages a first one of said pair of detents as said separator is positioned at said first station and engages the other one of said pair of detents as said separator is positioned at said second station.

3. The turkey call device according to claim 2, including a spring adapted to bias said nub in abutting engagement with said camming surface.

* * * * *